United States Patent [19]

Stotts

[11] Patent Number: 5,598,696
[45] Date of Patent: Feb. 4, 1997

[54] CLIP ATTACHED HEAT SHIELD

[75] Inventor: Robert E. Stotts, Newark, N.Y.

[73] Assignee: Parker-Hannifin Corporation, Cleveland, Ohio

[21] Appl. No.: 309,382

[22] Filed: Sep. 20, 1994

[51] Int. Cl.$^6$ .................................................. F02C 7/22
[52] U.S. Cl. ........................ 60/39.02; 60/740; 60/39.32
[58] Field of Search .......................... 60/39.31, 39.32, 60/740, 760, 39.02; 239/265.17, 132.3, 132.5

[56]  References Cited

U.S. PATENT DOCUMENTS

| 2,780,061 | 2/1957 | Clarke et al. | 60/740 |
| 3,032,990 | 5/1962 | Rogers | 60/740 |
| 3,159,971 | 12/1964 | Moebius et al. | 60/740 |
| 4,070,826 | 1/1978 | Stenger et al. | 60/740 |
| 4,258,544 | 3/1981 | Gebhart et al. | 60/39.32 |
| 4,735,044 | 4/1988 | Richey et al. | 60/742 |
| 5,423,178 | 6/1995 | Mains | 239/132.5 |

*Primary Examiner*—Timothy S. Thorpe
*Attorney, Agent, or Firm*—Christopher H. Hunter

[57]  ABSTRACT

A heat shield assembly for a fuel nozzle of a gas turbine engine thermally isolates the heat shield from the fuel nozzle. The heat shield assembly includes a pair of U-shaped heat shield members secured together to form an enclosure for the fuel nozzle, and at least one clip member which secures the heat shield members to the fuel nozzle at about the midpoint of the fuel nozzle stem. The clip member includes a base which is attached to the stem of the fuel nozzle such as by brazing or welding. The clip member also includes at least one, and preferably two, outwardly-extending flexible connector arms which are attached to the heat shield members. The arms are preferably attached to the heat shield such as by welding the arms into the seams of the heat shield members when the heat shield members are initially secured together. The open upper end of the heat shield is sized so as to tightly receive an enlarged neck of the fuel nozzle to prevent combustion gasses from flowing between the heat shield members and the fuel nozzle.

27 Claims, 3 Drawing Sheets

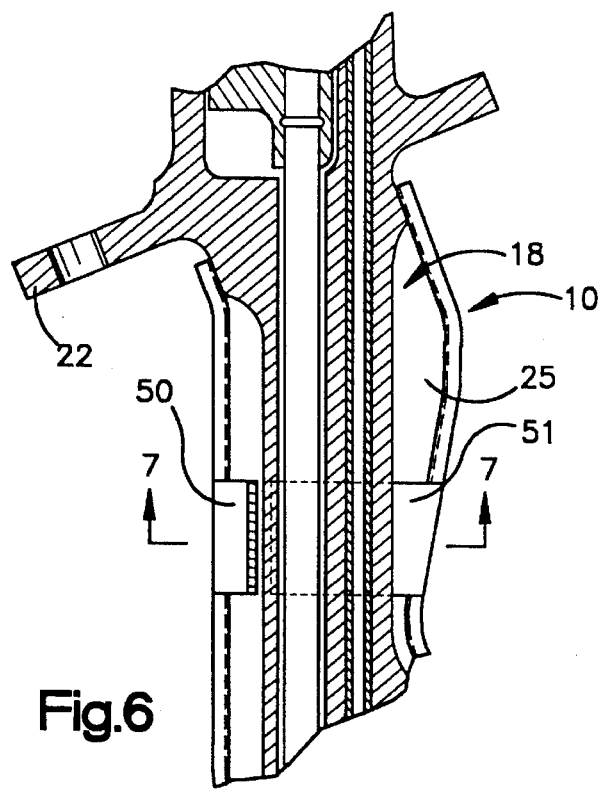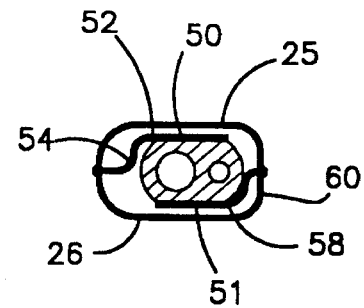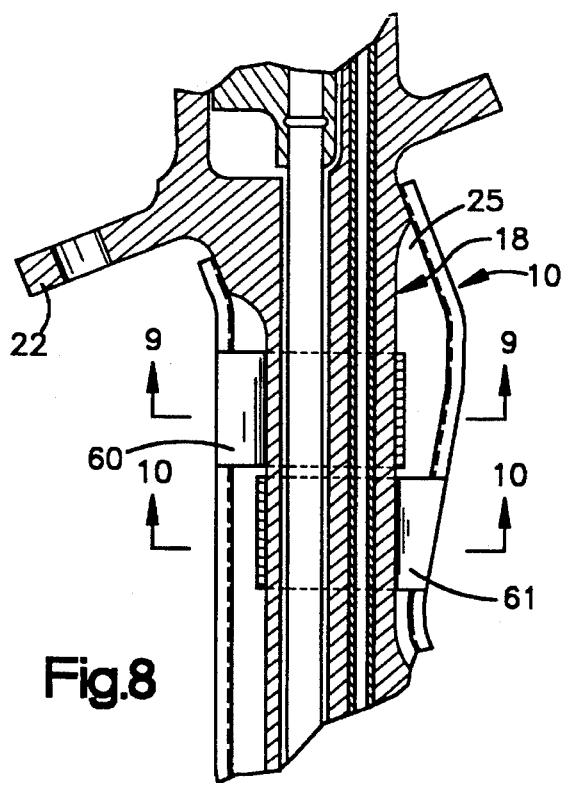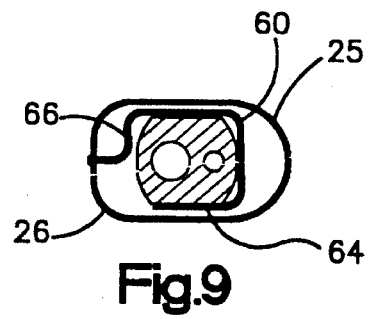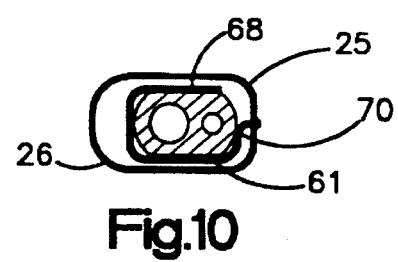

CLIP ATTACHED HEAT SHIELD

FIELD OF THE INVENTION

The present invention relates generally to fuel nozzles for gas turbine engines of aircraft, and more particularly to a heat shield assembly for the fuel nozzle.

BACKGROUND OF THE INVENTION

Fuel nozzles for gas turbine engines on an aircraft direct fuel from a manifold to a combustion chamber. The fuel nozzle typically has an inlet fitting connected to the manifold, a spray nozzle located within the combustion chamber of the engine for atomizing the fuel, and a stem extending between and fluidly interconnecting the inlet fitting and the atomizing nozzle. Appropriate check valves and/or flow dividers can be disposed within the fuel nozzle to control the flow of fuel through the spray nozzle. Each fuel nozzle has an attachment flange which enables the nozzles to be attached to the combustor casing of the engine in a spaced-apart manner to dispense fuel in a generally cylindrical pattern.

The fuel nozzle typically includes a heat shield assembly surrounding the portion of the stem within the engine casing. The heat shield assembly is necessary because of the high temperatures within the engine casing. The heat shield assembly prevents the fuel from breaking down into its constituent components (i.e., "coking") which occurs when the wetted walls of a fuel passage exceed 400 degrees Fahrenheit. The coke in the fuel nozzle can build up to restrict fuel flow through the nozzle.

The heat shield assembly typically comprises a pair of outer U-shaped heat shield members which are located on opposite sides of the nozzle stem, and extend axially therealong. The heat shield members are secured together along opposed abutting surfaces such as by welding or brazing the seams between the heat shield members. The heat shield assembly is then attached to the fuel nozzle. In the past, it is known that the open upper end of the heat shield assembly has been attached to an enlarged neck on the stem of the fuel nozzle. The neck of the stem is located directly below the attachment flange for the fuel nozzle. Known techniques for attaching the heat shield assembly to the neck include brazing, welding, or mechanical means such as by clamping or friction fit. The braze or weld is provided entirely around the neck of the stem, while the clamps typically surround the upper end of the heat shield members. The attachment of the shield assembly to the nozzle also closes off the upper end of the heat shield assembly to prevent heated and pressurized gases from flowing between the heat shield assembly and the stem of the fuel nozzle. The heat shield members are typically unattached at their bottom end around the atomizing nozzle to allow for thermal expansion of the heat shield assembly.

The known attachment techniques for the heat shield assembly are not without drawbacks. For example, there can be large stresses associated with fixedly attaching the upper end of the heat shield assembly to the neck of the fuel nozzle. These stresses occur because of the operating conditions of the engine (high temperatures, transients, etc.), as well as because of the difference in material and dimensional characteristics of the heat shield members and the fuel nozzle. In particular, the heat shield members are much thinner and are typically formed from a more flexible and workable material than the fuel nozzle. The thermal expansion characteristics of the heat shield assembly can differ greatly from the fuel nozzle. A thermal gradient can therefore appear across the braze or weld attachment of the heat shield members to the fuel nozzle, which can detrimentally affect this attachment over time. The stresses can also loosen or break clamps or other mechanical means holding the heat shield assembly on the fuel nozzle.

Thus, it is believed that there is a demand in the industry for a heat shield assembly which is securely and reliably attached to the fuel nozzle of a gas turbine engine.

SUMMARY OF THE INVENTION

The present invention provides a novel and unique heat shield assembly which is securely and reliably attached to the fuel nozzle of a gas turbine engine to prevent coking of fuel within the nozzle. Moreover, the heat shield assembly is relatively simple and inexpensive to manufacture and assemble.

The heat shield assembly of the present invention includes a pair of U-shaped heat shield members which are welded or brazed together along a pair of seams, and according to a first embodiment, includes a single clip member which secures the heat shield members to the fuel nozzle at about the midpoint of the fuel nozzle stem. The clip member includes a base which is attached to the stem of the fuel nozzle by brazing or welding. The clip member also includes at least one, and preferably two, outwardly-extending flexible connector arms which are attached to the heat shield members. The connector arms are preferably attached to the heat shield members by locating the arms in the seams between the heat shield members and welding the arms within the seams when the heat shield members are initially secured together. The open upper end of the heat shield is preferably sized so as to tightly receive the enlarged neck on the fuel nozzle.

According to other embodiments of the present invention, the heat shield assembly includes a pair of clip members to secure the heat shield members of the heat shield to the fuel nozzle. The clip members of these further embodiments also include a base attached to the stem of the fuel nozzle and at least one flexible arm extending from the base to an attachment on the heat shield. The arm(s) are also preferably captured and welded between the heat shield members when the heat shield members are initially secured together. The clip members can be located on opposite sides of the fuel nozzle stem in a common radial plane perpendicular to the axis of the fuel nozzle, or can be spaced axially apart from each other along the stem of the fuel nozzle on either the same side or on opposite sides of the fuel nozzle.

In any case, the clip members described above thermally isolate the heat shield members from the fuel nozzle. Moreover, the flexibility of the arm(s) on each clip member permits thermal expansion between the heat shield members and the fuel nozzle. The clip member thereby minimizes the thermal stresses of the heat shield attachment, which prolongs the life of the braze or weld attachment of the heat shield assembly with the fuel nozzle. Finally, the heat shield members shield the clip member from the detrimental effects of the hot gases within the engine casing.

The present invention thereby provides a heat shield assembly for preventing coking of fuel within the fuel nozzle of a gas turbine engine which is securely and reliably attached to the fuel nozzle, and which is relatively simple and inexpensive to manufacture and assemble.

Other features and advantages of the present invention will become apparent from the following specification and accompanying drawings.

BRIEF DESCRIPTION OF THE DRAWINGS

FIG. 6 is a partial side view in section of a fuel nozzle with a heat shield assembly constructed according to an additional embodiment of the present invention;

FIG. 7 is a cross-sectional view of the fuel nozzle taken substantially along the plane described by the lines 7—7 of FIG. 6;

FIG. 8 is a partial side view in section of a fuel nozzle with a heat shield assembly constructed according to yet another embodiment of the present invention;

FIG. 9 is a cross-sectional view of the fuel nozzle taken substantially along the plane described by the lines 9—9 of FIG. 8; and FIG. 10 is a cross-sectional view of the fuel nozzle taken substantially along the plane described by the lines 10—10 of FIG. 8.

DETAILED DESCRIPTION OF THE PREFERRED EMBODIMENT

Figure 1:
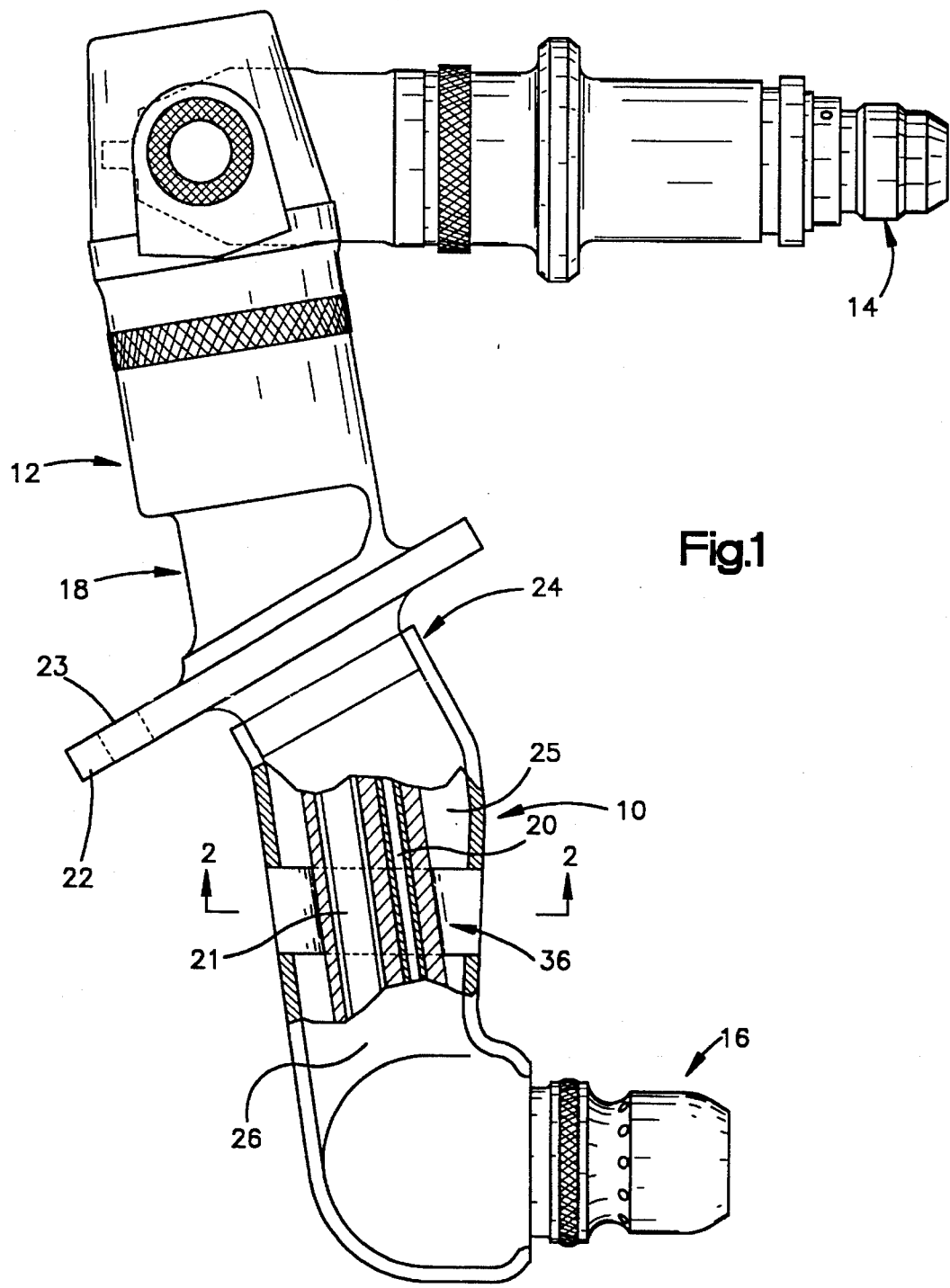
FIG. 1 is a side view in partial section of a fuel nozzle with a heat shield assembly constructed according to the principles of the present invention.
Figure 2:
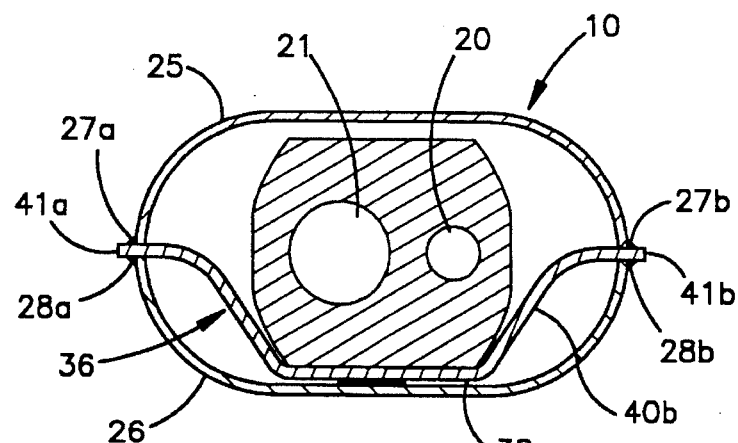
FIG. 2 is a cross-sectional view of the fuel nozzle with heat shield assembly taken substantially along the plane described by the lines 2—2 of FIG. 1.
Figure 3:
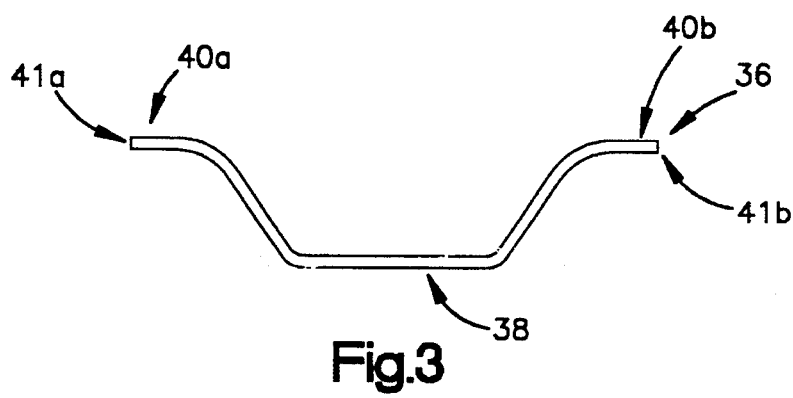
FIG. 3 is a side view of the clip member for the heat shield assembly of FIG. 1.
Figures 4, 5:
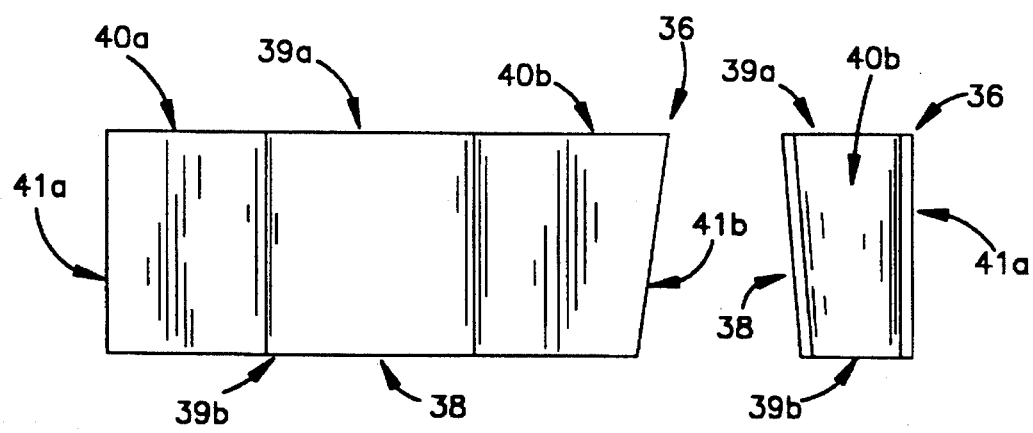
FIG. 4 is a top plan view of the clip member of FIG. 3.
FIG. 5 is a side view of the clip member of FIG. 3.

Referring to the drawings, and initially to FIGS. 1–5, a heat shield assembly of the present invention is indicated generally at 10, and is shown attached to a fuel nozzle, indicated generally at 12, of a gas turbine engine. The fuel nozzle 12 is conventional in design and typically includes an inlet fitting, indicated generally at 14, attached to the fuel manifold of the engine, and an atomizing nozzle, indicated generally at 16, which is located within the combustor chamber of the engine for delivering fuel in a spray. A fuel nozzle stem, indicated generally at 18, extends between and fluidly interconnects the inlet fitting 14 and the atomizing nozzle 16. The stem 18 can include one or more fuel conduits, for example, a primary fuel conduit 20 and a secondary fuel conduit 21, which supply fuel to one or more spray orifices in the atomizing nozzle 16. A flange 22 is formed integrally with the stem and extends outwardly away from the fuel nozzle. The flange includes attachment apertures (one of which is shown at 23) to enable the fuel nozzle to be attached to the wall of the combustion chamber, as is known in the art. An enlarged tubular neck portion, indicated generally at 24, is formed beneath the flange 22, as is commonly provided with these types of fuel nozzles. Appropriate check valves and flow dividers (not shown) can also be provided within the fuel nozzle for regulating the flow of fuel through the nozzle. An appropriate fuel nozzle for the present invention is commercially available from the assignee of the invention under Parker-Hannifin Corporation Part No. 6810166M22, although the fuel nozzle can have other common structural configurations which should be apparent to those skilled in the art upon understanding the principles of the present invention.

The heat shield assembly for the fuel nozzle comprises first and second outer heat shield members 25, 26 which extend axially along and enclose the stem 18 of the fuel nozzle. The heat shield members typically extend longitudinally along the stem in the combustion chamber from the enlarged neck 24 of the fuel nozzle to the atomizer nozzle 16. The heat shield members are conventional in design and preferably comprise identical U-shaped members which are located on either side of the nozzle stem and extend widthwise from the rear of the fuel nozzle to the front. The inside dimensions of the heat shield members are such that at least a 0.010"to 0.015"gap is provided between the stem and the heat shield members. The heat shield members 25, 26 have outwardly-projecting flanges 27a, 27b and 28a, 28b, respectively, extending axially along each side edge. The heat shield members are located together such that the members can be welded or brazed together along these flanges. The heat shield members are formed from an appropriate material with an appropriate thickness to protect the fuel nozzle stem from the elevated temperatures of the gases in the engine casing. Preferably, this material is INCO 625, with a thickness of about 0.025".

The heat shield assembly 10 further includes means for attaching the outer heat shield members to the stem 18 of the fuel nozzle. According to a first embodiment of the present invention, this means includes a single clip member, indicated generally at 36. The clip member 36 includes a base 38 having upper and lower edges 39a, 39b. The base 38 has a configuration so as to be substantially flush with the outer surface of the nozzle stem (see, e.g., FIG. 2). The clip also includes at least one, and preferably two, flexible connector arms 40a, 40b which are formed in one piece with and extend outwardly from opposite sides of the base 38. Each arm is first bent inwardly and then outwardly toward its distal end such that the clip member forms a U-shape. The clip member is preferably formed (e.g., stamped and bent appropriately) from a hard flexible material, for example INCO 625, with a thickness of 0.025". The overall length and width of the clip member can vary depending upon the particular fuel nozzle application.

Preferably, the base 38 of the clip member is attached to the stem of the fuel nozzle such as by locating the base 38 flush against the stem and attaching the base by, e.g., brazing or welding. The clip is preferably attached at about the midpoint of the fuel nozzle stem, although it should be understood that the clip member could be located anywhere within the confines of the heat shield along the axial length of the stem. Preferably, the clip member extends lengthwise along one side of the fuel nozzle, with arm 40a extending toward the rear of the fuel nozzle, and arm 40b extending toward the front of the fuel nozzle. (See e.g., FIG. 2). The distal ends 41a, 41b of the arms extend out to about the centerline of the fuel nozzle stem.

The connector arms 40a, 40b of the clip member are attached to the heat shield such as by welding or brazing. Preferably, the arms are captured between the opposing edges of the heat shield members and welded therebetween when the heat shield members are initially secured together. For example, the distal end 41a of arm 40a can be captured between corresponding flanges 27a, 28a on one side of the heat shield members, while the distal end 41b of other arm 40b can be captured between corresponding edges 27b, 28b on the other side of the heat shield members. In so doing, the arms of the clip member extend outward from the fuel nozzle stem in a plane substantially perpendicular to the axis of the fuel nozzle. This attachment method makes it relatively simple and inexpensive to attach the clip member to the heat shield after the clip member is initially brazed or welded to the fuel nozzle. As can be seen from FIG. 2, the connector arms have a flexible configuration to allow for thermal expansion of the heat shield with respect to the fuel nozzle. Moreover, the arms thermally isolate the weld or braze attachment on the base of the clip member from the outer heat shield. The arms of the clip member preferably have the same or about the same thickness as the heat shield members to reduce the thermal stresses at this interface. Finally, the outer heat shield surrounds the fuel nozzle, and in so doing surrounds the attachment of the clip member to the fuel nozzle, thus shielding the braze or welded attachment of the clip member from engine temperatures. The clip member thereby isolates the heat shield from the fuel nozzle, which prolongs the life of the braze or weld attachment of the heat shield to the fuel nozzle.

Finally, the upper end of the heat shield is preferably sized so as to have a tight fit with the enlarged neck portion 24 of the fuel nozzle. This tight fit prevents combustion gases from flowing between the fuel nozzle stem and the heat shield. Since the clip member is serving as the primary attachment means for the heat shield, this friction fit can loosen over time without detrimentally affecting the function of the heat shield. The bottom of the heat shield is preferably unattached to allow for thermal expansion of the heat shield.

Referring now to FIGS. 6 and 7, the means for attaching the housing members 25, 26 of the heat shield 10 to the fuel nozzle can also comprise a pair of clip members 50, 51. In this embodiment, each clip member can be located on opposite sides of the fuel nozzle stem 18 in a common radial plane perpendicular to the axis of the fuel nozzle. The clip members 50, 51 are substantially identical to each other and are formed of the same material and thickness as described previously. Each clip member has a base attached to the fuel nozzle stem, and at least one flexible connector arm which extends outwardly from the base to an attachment with the heat shield. For example, clip member 50 has base 52 with arm 54 which extends rearwardly to the heat shield members, while clip member 51 has base 58 with arm 60 which extends forwardly to the heat shield members. Again, each base is preferably brazed or welded to the stem of the fuel nozzle; while the arm of each clip member is preferably welded within the seam formed between the heat shield members.

Finally, referring now to FIGS. 8–10, an additional embodiment of the present invention is illustrated showing a further means for attaching the heat shield members 25, 26 to the fuel nozzle. In this embodiment, this attachment means also includes a pair of clip members 60, 61, each of which has a base. However, each clip member includes a single flexible connector arm extending outwardly from the base which wraps around at least a portion of the fuel nozzle stem 18 before extending to the heat shield. For example, clip member 60 includes a base 64 and a flexible arm 66 which extends outwardly and rearwardly from the base and wraps around almost the entire circumference of the stem; while clip member 61 includes a base 68 and a flexible arm 70 which extends outwardly and forwardly from the base and also wraps around almost the entire circumference of the stem. The base 64 of clip member 60 and base 68 of the clip member 61 can be attached to the stem of the fuel nozzle in the same manner as described previously, e.g., by brazing or welding. Likewise, the arm 66 of clip member 60 and arm 70 of clip member 61 can also be attached to the heat shield members 25, 26 in the same manner as described previously, e.g., by capturing the distal ends of the clip member arms within the seam between the heat shield members when the heat shield members are initially secured together. In this embodiment, the clip member 60 and clip member 61 are preferably spaced at different axial locations along the fuel nozzle stem.

In any of the embodiments discussed above, a novel and unique heat shield assembly for the fuel nozzle of a gas turbine engine is provided. The clip member of the heat shield assembly of the present invention provides for thermally isolating the heat shield members from the fuel nozzle in a manner which is reliable and which is relatively simple and inexpensive to manufacture and assemble.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A heat shield assembly for a fuel nozzle of a turbine engine, comprising:
   i) a shield housing extending axially along and enclosing at least a portion of the fuel nozzle, and
   ii) an isolation member including a base for attachment to the fuel nozzle and at least one flexible arm extending outwardly away from the base and attached to the shield housing at a spaced-apart location from said base, said at least one flexible arm of said isolation member substantially thermally and vibrationally isolating said shield housing from the fuel nozzle.

2. The heat shield assembly as in claim 1, wherein said shield housing has a tubular configuration defining an open upper end tightly receiving the fuel nozzle to prevent combustion gases in the engine from passing between the upper end of the shield housing and the fuel nozzle.

3. The heat shield assembly as in claim 2, wherein said shield housing includes two mating U-shaped heat shield members which are secured together along a pair of corresponding seams, said isolation member being attached to said shield housing along at least one of said seams.

4. The heat shield assembly as in claim 3, wherein said housing of said heat shield and said isolation member are welded together along said at least one of said seams.

5. The heat shield assembly as in claim 2, wherein said shield housing includes a distal end spaced from said upper end which is unattached to the fuel nozzle and which allows thermal expansion of the shield housing.

6. The heat shield assembly as in claim 1, wherein said isolation member has a U-shaped configuration with a base and a pair of flexible arms formed in one piece with the base, each of said arms extending away from the base and attached to said shield housing at a location spaced from said base.

7. The heat shield assembly as in claim 1, wherein said shield housing comprises a pair of U-shaped shield members secured together along a pair of abutting side surfaces, and said at least one arm has an end which is disposed between the pair of abutting side surfaces of the shield members and secured therein.

8. The heat shield assembly as in claim 7, wherein said shield members and said arm end are welded together.

9. The heat shield assembly as in claim 1, further including a second isolation member also attached to the shield housing and extending inwardly away from the shield housing for attachment with the fuel nozzle, said second isolation member also having at least one flexible arm extending away from said base and attached to said shield housing substantially thermally and vibrationally isolate said shield housing from the fuel nozzle.

10. The heat shield assembly as in claim 9, wherein said second isolation member is attached at a diametrically opposite location on the shield housing from the first isolation member.

11. A heat shield assembly for a gas turbine fuel nozzle comprising a heat shield housing and an isolation member, said housing including a first heat shield member, a second heat shield member, said heat shield members being fastened together along an elongated seam and cooperatively defining a heat shield chamber, said isolation member being disposed entirely within said heat shield chamber, said isolation member including a base portion, a first flexible connector portion extending away from one end of said base portion and fastened to at least one of said heat shield members at a location spaced from said base portion, and a second flexible connector portion spaced from said first connector portion and extending away from another end of said base portion.

12. The heat shield assembly as in claim 11, wherein said first connector portion terminates adjacent said seam.

13. The heat shield assembly as in claim 11, wherein said first connector portion is disposed between and connected to each of said first and second heat shield members at the location of said seam.

14. The heat shield assembly as in claim 11, wherein said isolation member is flexible.

15. The heat shield assembly as in claim 11, further including a second isolation member disposed within said heat shield chamber, said second isolation member including a first flexible connector portion fastened to at least one of said heat shield members and a second flexible connector portion spaced from said first connector portion and a base portion extending between said first and second connector portions.

16. The heat shield assembly as in claim 15, wherein said first and second isolation members are integral.

17. The heat shield assembly as in claim 15, wherein said first and second isolation members are separate pieces.

18. A method of heat shielding a gas turbine fuel nozzle comprising fastening a base of an isolation member to said nozzle, encapsulating said nozzle stem and said isolation member with a heat shield housing, and fastening a flexible arm of said isolation member to said heat shield housing at a spaced-apart location from said base, said isolation member thermally and vibrationally isolating said heat shield housing from said nozzle stem.

19. The method as in claim 18, wherein said encapsulating step includes encapsulating a first portion of said nozzle stem with a first heat shield member, encapsulating a second portion of said nozzle stem with a second heat shield member, and simultaneously fastening said first and second heat shield members together along a seam and fastening said isolation member to said heat shield members at the location of said seam.

20. The method as in claim 19, wherein said isolation member is initially brazed to said nozzle and then welded to said heat shield housing.

21. The method as in claim 20, wherein said heat shield housing comprises a pair of heat shield members, each of which encapsulates a portion of said nozzle, said heat shield members and said isolation member being welded together along a common seam.

22. A gas turbine fuel nozzle assembly comprising a nozzle and a heat shield assembly, said heat shield assembly including a heat shield housing and an isolation member, said housing including a first heat shield member, a second heat shield member, and said first and second heat shield members being fastened together along an elongated seam and cooperatively defining a heat shield chamber, said isolation member being disposed within said heat shield chamber, said isolation member including a base portion fastened to said nozzle and a first flexible connector portion fastened to at least one of said heat shield members at a location spaced from said base portion.

23. The gas turbine fuel nozzle assembly as in claim 22, wherein said isolation member further includes a second flexible connector portion integral with said base, said second connector portion being fastened to at least one of said heat shield members at a location spaced form said base.

24. A gas turbine fuel nozzle assembly comprising a nozzle and a heat shield assembly, said heat shield assembly including a heat shield housing and an isolation member, said housing including a first heat shield member, a second heat shield member, and said first and second heat shield members being fastened together along an elongated seam and cooperatively defining a heat shield chamber surrounding said nozzle, said isolation member being disposed within said heat shield chamber and including a base portion located against and secured to said nozzle and a first flexible connector portion extending away from said base portion and said nozzle and welded to at least one of said heat shield members along said seam.

25. The gas turbine fuel nozzle assembly as in claim 24, wherein said base portion includes a first surface located against and secured to said nozzle and a second surface, opposite from said first surface, which is unattached to said heat shield housing.

26. The gas turbine fuel nozzle assembly as in claim 24, wherein said shield housing comprises a pair of U-shaped shield members secured together along a pair of abutting side surfaces, and said flexible connector portion has an end which is disposed between the pair of abutting side surfaces of the shield members and welded therein.

27. A gas turbine fuel nozzle assembly comprising a nozzle and a heat shield assembly, said heat shield assembly including a heat shield housing and an isolation means for attaching said heat shield assembly to said nozzle such that said heat shield assembly is substantially thermally and vibrationally isolated from said nozzle, said housing including a first heat shield member, a second heat shield member, and said first and second heat shield members being fastened together along an elongated seam and cooperatively defining a heat shield chamber, said isolation means being disposed within said heat shield chamber and including a first flexible connector portion secured to at least one of said heat shield members along said seam and a base portion integral with said first connector portion and secured to said nozzle.

\* \* \* \* \*